(12) United States Patent
Hirohama et al.

(10) Patent No.: US 6,707,390 B2
(45) Date of Patent: Mar. 16, 2004

(54) TIRE AIR PRESSURE MONITORING DEVICE

(75) Inventors: Tetsuro Hirohama, Hiratsuka (JP); Mitsuru Ooike, Hiratsuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 176 days.

(21) Appl. No.: 09/976,055

(22) Filed: Oct. 15, 2001

(65) Prior Publication Data

US 2002/0070876 A1 Jun. 13, 2002

(30) Foreign Application Priority Data

Oct. 19, 2000 (JP) ........................................ 2000-318842

(51) Int. Cl.[7] .............................................. B60C 23/00
(52) U.S. Cl. .............................. 340/870.11; 340/870.11; 340/870.16; 73/146.2
(58) Field of Search ..................... 340/870.11, 870.16, 340/870.28, 442, 447; 73/146.2, 146.8, 146, 146.4

(56) References Cited

U.S. PATENT DOCUMENTS 5,612,671 A * 3/1997 Mendez et al. ............. 340/447
5,838,229 A 11/1998 Robinson, III
6,441,728 B1 * 8/2002 Dixit et al. ................. 340/447

FOREIGN PATENT DOCUMENTS

| JP | 8-227492 A | 9/1996 |
| JP | 9-210827 A | 8/1997 |
| JP | 11-078445 A | 3/1999 |

* cited by examiner

*Primary Examiner*—Michael Horabik
*Assistant Examiner*—Hung Dang
(74) *Attorney, Agent, or Firm*—Shinjyu Global IP Counselors, LLP.

(57) ABSTRACT

A tire air pressure monitoring device is inexpensively constructed, and avoids misregistering ID codes from other vehicles by using a receiver that determines the ID code registration method based on the speed of the vehicle, and a function code setting process that sets the function code of the data intended for ID code registration based on the results of the ID code registration method determining process. The receiver identifies data intended for ID code registration by the function code, and then registers the ID code. Further, the receiver has an ID code permutation comparison process that permutes the ID codes received from a plurality of transmitters to form ID code permutation blocks. The receiver compares the ID code permutations of consecutive ID code permutation blocks, and registers the ID codes when the ID code permutations are the same in two consecutive ID code permutation blocks.

11 Claims, 3 Drawing Sheets

TIRE AIR PRESSURE MONITORING DEVICE

BACKGROUND OF THE INVENTION

1. Field of the Invention

The present invention generally relates a device for monitoring tire air pressure of a vehicle. More specifically, the present invention relates a tire air pressure monitoring device that registers the ID code of a transmitter, and a receiver for use therewith.

2. Background Information

Japanese Published Patent Application No. 11-78445 discloses a tire air pressure monitoring device that uses pressure sensors to detect the air pressure of each tire on a vehicle. A transmitter is installed on each of the wheels to wirelessly transmit the air pressure data detected and an identification (ID) code to a receiver mounted on the vehicle. An alarm is issued in response to any abnormal tire air pressure data received. This tire air pressure monitoring device registers the ID codes transmitted from the transmitters with the receiver when the vehicle departs, after the wheels are rotated, and after the transmitters are changed. This allows the above mentioned tire air pressure monitoring device to distinguish between which of the four wheels of the vehicle the air pressure data belongs, and to distinguish between data belonging to the vehicle in question and that belonging to another vehicle.

In related technology, three types of data are transmitted from the transmitters of tire air pressure monitoring device, i.e., function codes, ID codes, and air pressure data. There are several types of function codes, two of which are transmitted during ID code registration. The first type of function code is sometimes called a normal code that is transmitted when a run switch on a standard transmitter is placed into the ON position. When the speed of the vehicle increases above a specified level, the run switch moves to the ON position due to centrifugal force, and the transmitter starts to transmit data. The second type of function code is sometimes called a registration code that replaces the normal code only when an ID code registration device is employed and an ID code is registered. In other words, the registration code is transmitted when the run switch is in the OFF position and when the ID code registration device is in use.

However, during ID code registration, data used for ID code registration is not identified by these function codes. The ID codes are separate identification codes provided by the transmitters for distinguishing between which of the air pressure data belongs to which of the four wheels of the vehicle. The ID codes are also used to distinguish between data belonging to the vehicle in question and that belonging to another vehicle. An air pressure sensor provides the air pressure data.

There are two methods of ID code registration. The first method uses the ID code registration device to register the ID codes when the vehicle is stationary. Specifically, the receiver is first switched to an ID code registration mode. Then, the ID code registration device is operated and gives instructions to the transmitters. The transmitters add the registration code, the ID codes and the air pressure data to the data format that is normally transmitted at high frequency, and then convert the data format to low frequency data for wirelessly transmitting it. When the ID code registration device receives this low frequency data from the transmitters, the ID code registration device transmits the data to the receiver over a wire to register the ID codes provided by the transmitters. In this way, even if data from another vehicle is received, misregistration of the ID code can be avoided because the data from the other vehicle is not converted into a low frequency.

The second method registers the ID code while the vehicle is moving, but without using the ID code registration device. Specifically, the receiver is first switched to the ID code registration mode, after the vehicle is operated above a specified level. By operating the vehicle, the receiver receives the ID codes provided by the data transmitted from the transmitters, and ID code registration takes place.

In view of the above, there exists a need for an improved tire air pressure monitoring device that is configured to be inexpensively constructed, and avoid misregistering ID codes from other vehicles. This invention addresses this need in the art as well as other needs, which will become apparent to those skilled in the art from this disclosure.

SUMMARY OF THE INVENTION

In the tire air pressure monitoring device discussed above, the first ID code registration method can avoid misregistering the ID code of another vehicle. However, it has been discovered that the first ID code registration method is typically costly and difficult to construct because the ID code registration device and the receiver are hard wired together. In the second ID code registration method, when the vehicle in question approaches another vehicle, it receives data transmitted from the other vehicle, the ID code from the other vehicle is misregistered, and thus the air pressure of the tires on the vehicle in question cannot be accurately determined.

It is an object of the present invention to address the problems found in the prior art, and thus provide a tire air pressure monitoring device and a receiver used therewith which is inexpensively and simply constructed.

It is a further object of the present invention to provide a tire air pressure monitoring device and a receiver used therewith which can avoid misregistering the ID codes from another vehicle regardless of the registration method employed.

In order to solve the above-mentioned problems, a tire air pressure monitoring device is provide which comprises a receiving component, an ID code registration determining component, a function code setting component and an ID code registration component. The receiving component is configured to wirelessly receive a detected function code, an ID code, and tire air pressure data for each wheel of a vehicle. The ID code registration determining component is configured to determine an ID code registration method based on a rotational state of the wheels. The function code setting component is configured to set a reference function code based on the ID code registration method determined by the ID code registration determining component when the reference function code corresponds to the detected function code of the receiving component. The ID code registration component is configured to register the ID codes of the wheels based on the reference function code set by the function code setting component.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
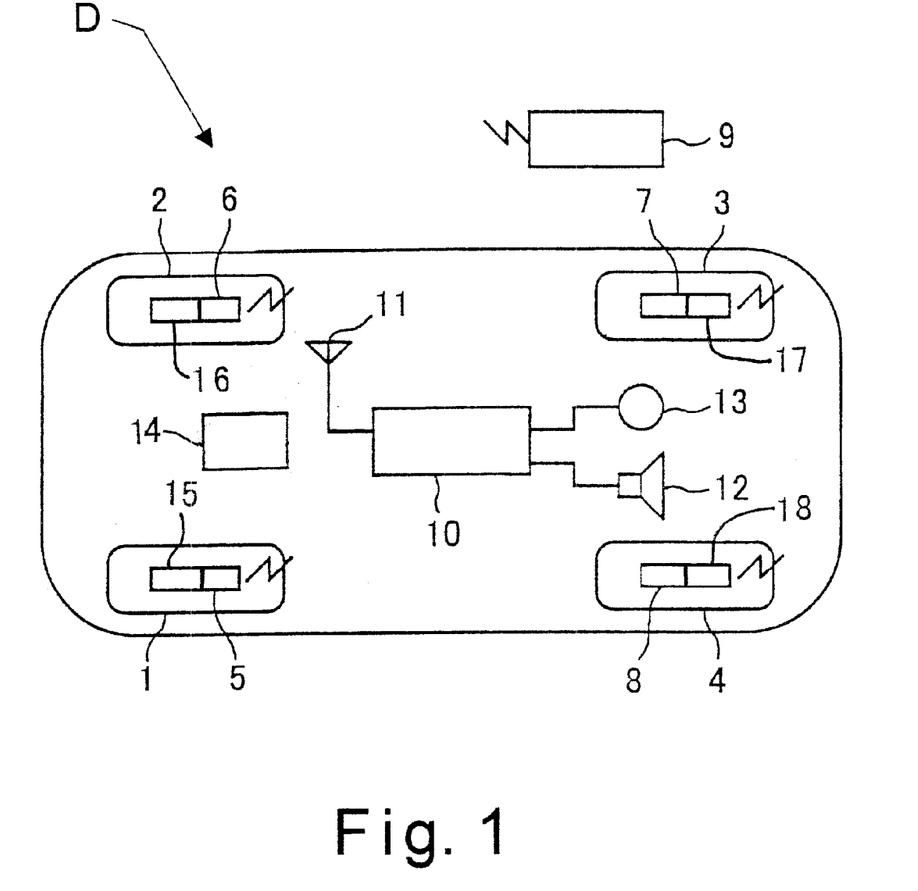
FIG. 1 is a diagrammatic illustration of a vehicle with a tire air pressure monitoring device installed thereon in accordance with one embodiment of the present invention.

Referring initially to FIG. 1, a tire air pressure monitoring device D is diagrammatically illustrated on a vehicle to explain one embodiment of the present invention. Thus, FIG. 1 shows the overall configuration of the tire air pressure monitoring device D of the present invention. As seen in FIG. 1, the vehicle has four pneumatic wheels 1, 2, 3 and 4 with one of the transmitters 5, 6, 7 and 8 of the tire air pressure monitoring device D being operatively coupled to the wheels 1, 2, 3 and 4, respectively, of the vehicle. The tire air pressure monitoring device D also has an ID code registration device 9 that is operatively (wirelessly) coupled to the transmitters 5, 6, 7 and 8. The vehicle also has a receiver 10 that is installed on the vehicle for wirelessly receiving data from the transmitters 5, 6, 7 and 8 and from the ID code registration device 9. Preferably, the receiver 10 has an antenna 11 to aid in receiving the data transmissions from the transmitters 5, 6, 7 and 8 and/or from the ID code registration device 9.

The tire air pressure monitoring device D is designed to provide a variety of information on the tires of the wheels 1, 2, 3 and 4. For example, each of the wheels 1, 2, 3 and 4 has a tire air pressure detection device 15, 16, 17 and 18, respectively, for detecting tire air pressure for the wheels 1, 2, 3 and 4. The tire pressure of each wheel is displayed to the driver and an alarm will produce a sound or signal in response to any abnormal tire air pressure data received. Of course, the tire air pressure detection devices 15, 16, 17 and 18 can also detect other operating conditions of the tire, such as temperature. The tire air pressure detection devices 15, 16, 17 and 18 are preferably conventional components that are well known in the art, but which have been configured to carry out the present invention as explained herein. Since the tire air pressure detection devices 15, 16, 17 and 18 are generally well known components in the art, the precise construction of the tire air pressure detection devices will not be discussed or illustrated in detail herein. Moreover, the transmitters 5, 6, 7 and 8 can be integrally constructed with the tire air pressure detection devices 15, 16, 17 and 18, respectively.

Because the tire air pressure monitoring device D uses tire air pressure detection devices 15, 16, 17 and 18, and transmitters 5, 6, 7 and 8 to wirelessly transmit function code data, ID (identification) data, and air pressure data to the receiver 10, it is possible to identify data intended for registration with different ID code registration methods as explained below. In addition, the tire air pressure monitoring device D operates wirelessly, and thus, can be constructed easily and inexpensively. Moreover, unlike that in other monitoring devices, transmitted data does not have to be converted, and the misregistration of ID codes from other vehicles can be avoided.

The receiver 10 of the tire air pressure monitoring device D registers the ID codes transmitted from the transmitters 5, 6, 7 and 8 so that the tire air pressure data for each of the wheels 1, 2, 3 and 4 is correctly correlated. As explained below, the ID code registration device 9 actuates the transmitters 5, 6, 7 and 8 to transmit a registration code as a detected function code when the wheels 1, 2, 3 and 4 are stationary (vehicle not moving). When the wheels 1, 2, 3 and 4 are rotating (vehicle is moving), run switches in the transmitters 5, 6, 7 and 8 cause the transmitters 5, 6, 7 and 8 to send a normal code as a detected function code to the receiver 10. Thus, the transmitters 5, 6, 7 and 8 uses two different registration methods to register ID codes for the wheels 1, 2, 3 and 4. This allows the tire air pressure monitoring device D to distinguish between which of the four wheels 1, 2, 3 and 4 of the vehicle the air pressure data belongs, and to distinguish between data belonging to the vehicle in question and that belonging to another vehicle.

The receiver 10 of the tire air pressure monitoring device D includes a receiving component, an ID code registration determining component, a function code setting component, and an ID code registration component. The ID code registration component includes an ID code permutation component and an ID code permutation comparison component, which are used in the second registration method when the wheels 1, 2, 3 and 4 are rotating (vehicle is moving). The receiving component is configured to wirelessly receives a detected function code, an ID code, and tire air pressure data for each wheel of a vehicle. The ID code registration determining component is configured to determine an ID code registration method based on a rotational state of the wheels. The function code setting component is configured to set a reference function code when the detected function code of the receiving component corresponds with to the ID code registration method determine by the ID code registration determining component. The ID code registration component is configured to register the ID codes of the wheels based on the reference function code set by the function code setting component.

The transmitters 5, 6, 7 and 8 are configured to transmit the tire air pressure of the wheels 1, 2, 3 and 4, respectively, and then simultaneously transmit various data that includes function codes, identification (ID) data or codes, and tire air pressures all at one time. The transmitters 5, 6, 7 and 8 wirelessly transmits this data to the receiver 10 is installed on the vehicle. The transmitters 5, 6, 7 and 8 are preferably conventional components that are well known in the art, but which have been configured to carry out the present invention as explained herein. Since the transmitters 5, 6, 7 and 8 are generally well known components in the art, the precise construction of the transmitters 5, 6, 7 and 8 will not be discussed or illustrated in detail herein. Likewise, the receiver 10 is preferably a conventional component that is well known in the art, but which has been configured to carry out the present invention as explained herein. Thus, the precise construction the receiver 10 will not be discussed or illustrated in detail herein.

Although not shown in the figures, each of the transmitters 5, 6, 7 and 8 has a run switch that moves to the ON position by means of centrifugal force when the speed of the vehicle increases above a specified or predetermined level. When the run switches move to their ON positions, the vehicle is considered to be operating under normal conditions for purposes of carrying out the present invention. Thus, the receiver 10 receives a normal code as a detected function code from each of the transmitters 5, 6, 7 and 8 when the run switches that move to the ON positions. However, when the run switches are in the OFF positions and the registration device 9 is used, the receiver 10 receives a registration code as a detected function code from each of the transmitters 5, 6, 7 and 8. Thus, depending upon the rotational state of the wheels 1, 2, 3 and 4, the tire air pressure monitoring device D either uses a first ID code registration method or a second ID code registration method, as explained below.

Stated differently, when the vehicle is stationary (i.e., the run switches are in the OFF position), each of the transmitters 5, 6, 7 and 8 transmits data that includes a registration code (first function code). More specifically, the ID code registration device 9 is brought next to the transmitters 5, 6, 7 and 8 such that one by one each transmitter 5, 6, 7 or 8 is individually activated to send the registration code (first function code) to the receiver 10. The receiver 10 receives the first function code (registration code) as a detected function code for each of the wheels 1, 2, 3 and 4 for comparing it with the rotational state of the wheels 1, 2, 3 and 4. The receiver 10 has a function code setting component that sets a first reference function code when the receiver 10 uses the first ID code registration method. Thus, when the vehicle is stationary and not operating under normal conditions, the ID code registration device 9 is used, and ID code registration occurs under a first ID code registration method. When the ID code registration device 9 is used, the registration code (first function code) along with the other data is transmitted when the run switch is in the OFF position. The registration code is a first function code that is intended for the ID code registration that takes place during the first registration method. The receiver 10 receives the transmitted data from the transmitters 5, 6, 7 and 8 and then identifies data used as a function code and registers the ID codes.

Under normal conditions (i.e., the run switches are in the ON positions), each of the transmitters 5, 6, 7 and 8 transmits data that includes a normal code (a second function code) when the run switch moves to the ON position. Preferably, a data transmission from each of the transmitters 5, 6, 7 and 8 to the receiver 10 takes place once every minute. The normal code is a function code used for the ID code registration that takes place during the second ID code registration method. In other words, the normal code is a detected function code that the function code setting component of the receiver 10 uses to set a second reference function code. The second reference function code is set by the receiver 10, when the ID code registration component of the receiver 10 uses the second ID code registration method to register the ID codes.

The receiver 10 functions as a wirelessly receiving mechanism that receives the function codes, ID (identification) codes and tire air pressure data for each wheel 1, 2, 3 and 4 of a vehicle. Thus, the receiver 10 functions as a control unit that preferably includes a microcomputer with an ID code registration program that controls the tire air pressure monitoring program as discussed below. The control unit portion of the receiver 10 can also include other conventional components such as an input interface circuit, an output interface circuit, and storage devices such as a ROM (Read Only Memory) device and a RAM (Random Access Memory) device. The memory circuit stores processing results and control programs such as ones for ID registering operation that are run by the processor circuit. The control unit portion of the receiver 10 is capable of selectively controlling any of the components in accordance with the control program. It will be apparent to those skilled in the art from this disclosure that the precise structure and algorithms for control unit portion of the receiver 10 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The ID code registration determining component of the receiver 10 determines the ID code registration method based on the rotational state of the tire wheels. The function code setting component sets a reference function code for ID code registration based on of the results of the ID code registration determining component. The control unit portion of the receiver 10 performs the ID code registration which takes place when the detected function code (normal code or registration code) received matches the rotational state of the wheels determined by the ID code registration determining component. Thus, it is possible to identify data intended for registration with different ID code registration methods. In addition, the receiver 10 operates wirelessly, and thus, can be constructed easily and inexpensively. Moreover, transmitted data does not have to be converted, and the misregistration of ID codes from other vehicles can be avoided.

The ID code registration determining component of the receiver 10 determines whether a first ID code registration method or a second ID code registration method is to be used based on the speed of the vehicle. The ID code registration determining component of the receiver 10 can be a velocity sensor 14 or any sensor that detects speed of the vehicle and/or the rotational state of the wheels 1, 2, 3 and 4. Because the ID code registration determining component determines whether the first ID code registration method or the second ID code registration method is to be used based on the speed of the vehicle and/or the rotational state of the wheels 1, 2, 3 and 4, the ID code registration method to be used can be easily determined.

The function code setting component of the receiver 10 sets the function code of the data intended for ID code registration to a first function code when the ID code registration determining component decides upon a first ID code registration method, and sets to a second function code when the ID code registration determining component decides upon a second ID code registration method. Because the function code setting component sets the function code of the data intended for ID code registration to a first function code when the ID code registration determining component decides upon a first ID code registration method, and sets to a second function code when the ID code registration determining component decides upon a second ID code registration method, data intended for registration can be identified by means of different registration methods.

For each cycle of the registration process, the receiver 10 permutes the number order of the ID codes received from the transmitters 5, 6, 7 and 8 into ID code permutation blocks and further includes an ID code permutation comparison component that compares the ID code permutations of at least two consecutive blocks. The receiver 10 registers ID codes when the ID code permutations compared by the ID code permutation comparison component matches, and stops registering ID codes when the ID code permutations they do not match, even though the function codes match.

Figure 2:
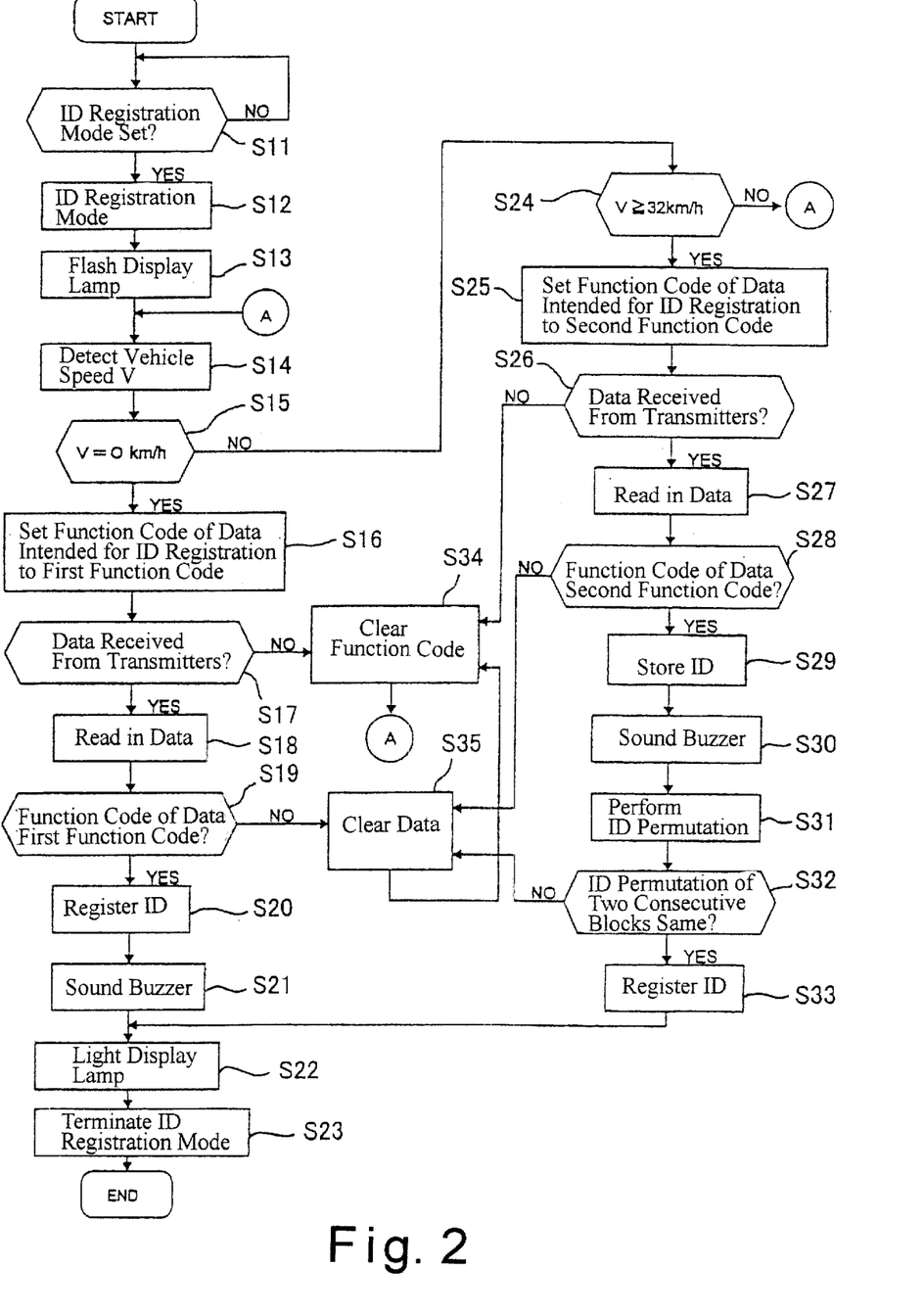
FIG. 2 is a flowchart showing an outline of the ID code registration process according to one embodiment of the present invention.

Next, the operation of the present invention will be described with reference to FIG. 2. FIG. 2 is a flowchart showing an outline of the ID code registration process according to one embodiment of the present invention. There are two methods of ID code registration in the tire air pressure monitoring device D of the present invention.

First, the first ID code registration method will be described, in which the ID code registration device 9 is employed when the vehicle is stationary. To begin, the ignition of the vehicle is moved to the ON position, and the tire air pressure monitoring device D is started. Then, when the operator places the receiver 10 in registration mode, the receiver 10 first determines that it has been placed into registration mode at Step S11, and then sets the tire air pressure monitoring device D to the registration mode at Step S12. Next, at Step S13, the receiver 10 flashes the display lamp 13 to indicate that the registration mode has been set. When this display is completed, the ID code registration determining component of the receiver 10 detects vehicle speed V using velocity sensor 14 at Step S14. The detect vehicle speed V can be obtained in a variety of ways. For example, an existing meter can be used to obtain a vehicle speed signal, or an independent sensor or the like can be used to obtain a wheel speed signal that is used to obtain a vehicle speed signal.

Next, at Step S15, the receiver 10 determines if the first ID code registration method will be executed in the stationary state. In other words, the receiver 10 determines whether the vehicle is moving or stationary. This determination can be accomplished by monitoring within a predetermined time period, such as 1 minute, whether the absolute value of the vehicle speed signal is greater that zero more than once ($|V|>0$). If the vehicle speed signal is greater that zero more than once within a predetermined time period), then the vehicle is moving. If the vehicle speed signal is not greater that zero more than once within a predetermined time period, then the vehicle is stationary. Then, at Step S16, after the function code setting component of the receiver 10 determines the first ID code registration method will be executed (vehicle is stationary) the function code setting component of the receiver 10 will set the ID code registration code as the first reference function code, which must be provided by the data intended for ID code registration.

In the event that the vehicle is temporarily in the stationary state, but due to the generation of an abnormal signal, the receiver 10 will receive a vehicle speed signal at Step S14 that indicates the vehicle is moving. Thus, at Step S15, the receiver 10 determines that the second ID code registration method is to be executed and the ID code registration method moves to Step S24. At Step S24, if the vehicle speed is below a specified level as determined by sensor 14, then the receiver 10 returns to Step S14. However, if the vehicle speed signal is detected as being above a specified level as determined by sensor 14 but in fact the vehicle is stationary, then the receiver 10 passes through Step S25, because the run switch is in the OFF position and no data is being transmitted from the transmitters 5, 6, 7 and 8. If the receiver 10 determines that data is not being received at Step 26, because the run switch is in the OFF position (the vehicle is stationary), then the ID code registration process moves to Step S34. At Step S34, the function code set at Step S16 is cleared, and then the ID code registration method returns to Step S14.

Next, after the ID code registration method of Step S16, the operator actuates the ID code registration device 9. The ID code registration device 9 instructs each of the transmitters 5, 6, 7 and 8 to transmit data to the receiver 10 including the registration code as the first function code. In addition, because there are four wheels on the vehicle, the ID code registration device 9 registers the ID code numbers for each of the wheels 1, 2, 3 and 4 one by one in a predetermined order. For example, the ID code registration device 9 registers the ID code numbers for the wheels in a clockwise manner, e.g., first the left front wheel 1, then the right front wheel 2, then the right rear wheel 3, and finally the left rear wheel 4. First, when the ID code registration device 9 is brought near the transmitter 5 of the left front wheel 1 and an order to transmit is actuated, the transmitter 5 of the left front wheel 1 then transmits a registration code, an ID code for the left front wheel 1, and the current air pressure data for the left front wheel 1. At Step S17, the receiver 10 determines whether or not it has received data transmitted from the transmitter 5 of the left front wheel 1. When the receiver 10 has received the data from the transmitter 5 of the left front wheel 1, the receiver 10 reads in the data on the left front wheel 1 at Step S18. When the receiver 10 has not received the data from the transmitter 5 of the left front wheel 1, the receiver 10 moves to Step S34, where the function code is cleared and the detection cycle is started over again at Step S14.

Next, after the process at Step S18, the receiver 10 determines at Step S19 whether or not the function code for the data that was previously read in at Step S18 is the registration code that was previously set. When the function code for the data previously read in is a registration code, the ID code for the left front wheel 1 is registered at Step S20, and a buzzer 12 sounds at Step S21 to indicate the wheel 1 has been registered. When the function code for the data previously read in is not a registration code, the process moves to Step S35, where the data previously read in is cleared. Then, the process moves to Step S34 where the function code is cleared and the detection cycle is started over again at Step S14.

Then, processes and operations of Step S17 to Step S21 are repeated for the remaining three wheels in the same manner as that described above. In addition, the number of times the buzzer sounds at Step S21 can differ according to each wheel so that registration of each wheel can be easily determined.

After the process at Step S21, the receiver 10 lights up the display lamp 13 at Step S22, and displays the ID code registration. At Step S23, the ID code registration mode is terminated, and the ID code registration task is completed.

With respect to the detection of the vehicle speed V at Step S14, a vehicle speed of zero can also be detected by compelling the generation of a vehicle speed signal that corresponds to a vehicle speed of zero. This can occur by actuating a trigger switch on a jumper wire or the like on the receiver 10.

Next, the second ID code registration method will be described, in which the vehicle is moving and the ID code registration device 9 is not used. The processes of Step S11 to Step S13 are identical with processes performed in the first ID code registration method. After the process of Step S13, the operator operates the vehicle and the receiver 10 detects the vehicle speed V at Step S14 via sensor 14. The detection of the vehicle speed V is identical with that of the first ID code registration method.

When a vehicle speed signal is transmitted to the receiver 10 that the vehicle is moving the function code setting component of the receiver 10 sets a second reference function code and determines that the second ID code registration method will be executed, and the process moves to Step S24.

Although the vehicle is moving, at Step S14, if the receiver 10 erroneously receives a vehicle speed signal that indicates that the vehicle is stationary, due to a failure in the vehicle speed signal from sensor 14 or the like, it will determine that the first ID code registration method is to be executed. However, because the ID code registration device 9 has in fact not been actuated, the receiver 10 will pass through Step S16, determine at Step S17 that data from each of the transmitters 5, 6, 7 and 8 has not been received, and then move to Step S34.

Next, at Step S24, the receiver 10 determines that the second ID code registration method is to be executed when the vehicle speed V is greater than a specified or predetermined value (for example, at a speed V=32 km/h run switch moves to the ON position, and each of the transmitters 5, 6, 7 and 8 begins to transmit data). At Step S25 the receiver 10 sets the normal code as the second function code, which must be provided by the data intended for ID code registration. When the vehicle speed V is below a specified or predetermined value, then the receiver 10 returns to Step S14.

Then, since the vehicle is moving, the run switch is moved to the ON position and each of the transmitters 5, 6, 7 and 8 transmits a normal code, ID code, and air pressure data. At Step S26, the receiver 10 determines whether or not data transmitted from each of the transmitters 5, 6, 7 and 8 has been received, and when it has been received, the data is read in at Step S27. When it has not been received, the receiver 10 moves to Step S34.

Next, at Step S28, the receiver 10 determines whether or not the function code of the data read in at Step S27 is the normal code that was set. When the function code of the data read in is the normal code, the ID code is temporarily stored at Step S29, and the buzzer 12 sounds at Step S30. When the function code of the data read in is not the normal code, the receiver 10 moves to Step S35. In addition, because there are four wheels 1, 2, 3 and 4 on the vehicle, the processes of Step S27 to Step S30 are repeated for each tire in a manner identical to that of the first ID code registration method. Further, the number of times the buzzer sounds at Step S30 can differ according to each wheel 1, 2, 3 or 4.

After the process of Step S30, the receiver 10 at Step S31 takes the stored ID codes of the four wheels and produces one ID code permutation block. At Step S32, the receiver 10 determines whether or not two blocks of ID code permutations are in the same consecutive order. When the ID code permutations are the same, the ID codes of all 4 wheels are registered at Step S33, the display lamp 13 is lit at Step S22 and indicates that ID code registration has taken place, and at Step S23 the ID code registration mode is terminated and the ID code registration task is completed. When the ID code permutations are not the same, the receiver 10 moves to Step S35.

Table 1 shown below shows the ID code permutation comparison method of this embodiment of the present invention, and serves to provide a more detailed explanation of the process that takes place between Step S31 and Step S32.

TABLE 1

| ID code Permutation Comparison Results | First Block | Second Block |
| --- | --- | --- |
| ID codes of Primary Vehicle Only | ID1 • ID2 • ID3 • ID4 | ID1 • ID2 • ID3 • ID4 |

TABLE 1-continued

| ID code Permutation Comparison Results | First Block | Second Block |
| --- | --- | --- |
| ID codes of Primary Vehicle Mixed With Incidental Vehicle (Ex. 1) | ID1 • ID2 • ID3 • ID5 | ID4 • ID1 • ID2 • ID3 |
| ID codes of Main Vehicle Mixed With Incidental Vehicle (Ex. 2) | ID1 • ID2 • ID3 • ID4 | ID5 • ID1 • ID2 • ID3 |

Figure 3:
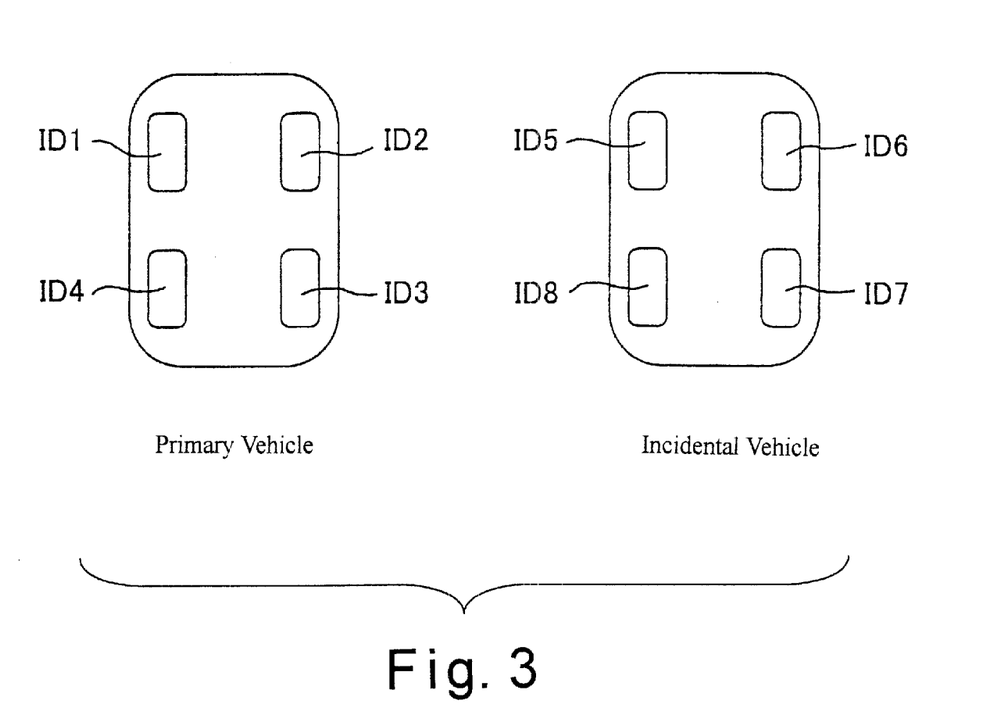
FIG. 3 is a diagrammatic illustration of a pair of vehicles that show the distribution of ID codes among the two vehicles according to one embodiment of the present invention.

As shown in FIG. 3, each of the transmitters 5, 6, 7 and 8 has a separate ID code, with the ID codes of the primary vehicle in question being ID1 to ID4, and the ID codes of the other incidental vehicle being ID code 5 to ID code 8.

The receiver 10 stores the ID codes included in the data transmitted from each of the transmitters 5, 6, 7 and 8, and at Step S31, produces ID code permutations from the ID codes stored in numerical order. Then, at Step S32, the receiver 10 compares the numerical order of a first ID code permutation block formed from the $1^{st}$ to $4^{th}$ stored ID codes, to a second ID code permutation block formed from the $5^{th}$ to $8^{th}$ stored ID codes, and determines whether or not they are the same.

For example, in the event that an ID5 from another incidental vehicle is received in the first block, i.e., Example 1 of Table 1, the ID code permutation of the first block is permuted as ID1 •ID2 •ID3 •ID5, and the ID code permutation of the second block is permuted as ID4 •ID1 •ID2 •ID3. The ID code permutations of the first and second blocks are not the same.

In the other example, in the event that an ID5 from another incidental vehicle is received in the second block, i.e., Example 2 of Table 1, the ID code permutation of the first block is permuted as ID1 •ID2 •ID3 •ID4, and the ID code permutation of the second block is permuted as ID5 •ID1 •ID2 •ID3. The ID code permutations are not the same. Accordingly, ID codes from other incidental vehicles can be distinguished by comparing the numerical order of the ID code permutations of the two blocks.

In addition, as a method of identifying which of the data received corresponds to which wheel 1, 2, 3 or 4, the receiver 10 first places the air pressure data set for each wheel 1, 2, 3 or 4 in numerical order from highest to lowest. The actual air pressure of each of the four wheels 1, 2, 3 and 4 is then manually adjusted to these set values. The receiver 10 is then able to determine which air pressure data corresponds to which wheel 1, 2, 3 or 4. For example, the highest air pressure data is set to be in the left front wheel 1, the second highest in the right front wheel 2, the third highest in the right rear wheel 3, and the fourth highest in the left rear wheel 4. The actual air pressure of the left front wheel 1 is then adjusted to be 2.5 bar, the right front wheel 2 is adjusted to be 2.3 bar, the right rear wheel 3 is adjusted to be 2.1 bar, and the left rear wheel 4 is adjusted to be 1.9 bar. After this, the data is read in and identified. After the task of ID code registration is completed, the air pressure of each wheel 1, 2, 3 or 4 can now be manually adjusted to its normal level.

In addition, the above-mentioned embodiment was described as using two function codes for ID code registration. However, in the event that there are three or more function codes, the function codes can be set to correspond to each ID code registration method.

Furthermore, the above-mentioned embodiment was described as having a run switch on the transmitters 5, 6, 7 and 8 which made use of centrifugal force. However, it is possible to use other types of devices to determine the rotational state of the vehicle. Moreover, it is possible to use transmitters that transmit data at regular fixed intervals to eliminate a run switch or any other type of device to determine the rotational state of the vehicle.

In addition, the above-mentioned embodiment, when there is only one type of ID code registration method and it is not necessary to set function codes, then the invention can avoid misregistering the ID codes of other vehicles. In this situation, after data for each wheel is read in, the processes of Step S31 to Step S33 can be applied.

As described above, the tire air pressure monitoring device D of the present invention and the receiver 10 used therewith can avoid misregistering the ID codes of other vehicles, regardless of which of the two ID code registration methods are used, and can be inexpensively constructed.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2000-318842. The entire disclosure of Japanese Patent Application No. 2000-318842 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents. Thus, the scope of the invention is not limited to the disclosed embodiments.

What is claimed is:

1. A tire air pressure monitoring device comprising:
   a receiving component configured to wirelessly receives a detected function code, an ID code, and tire air pressure data for each wheel of a vehicle;
   an ID code registration determining component configured to determine an ID code registration method based on a rotational state of the wheels;
   a function code setting component configured to set a reference function code based on said ID code registration method determined by said ID code registration determining component when said reference function code corresponds to said detected function code of said receiving component; and
   an ID code registration component configured to register said ID codes of the wheels based on said reference function code set by said function code setting component.

2. The tire air pressure monitoring device according to claim 1, wherein
   said function code setting component is configured to set said reference function code to a first reference function code when said ID code registration determining component uses a first ID code registration method, and said function code setting component is configured to set said reference function code to a second reference function code when said ID code registration determining component uses a second ID code registration method.

3. The tire air pressure monitoring device according to claim 1, wherein
   said ID code registration determining component is configured to selectively determine between using one of a first ID code registration method and a second ID code registration method depending upon the speed of the vehicle.

4. The tire air pressure monitoring device according to claim 3, wherein
   said function code setting component is configured to set said reference function code to a first reference function code when said ID code registration determining component uses a first ID code registration method, and said function code setting component is configured to set said reference function code to a second reference function code when said ID code registration determining component uses a second ID code registration method.

5. The tire air pressure monitoring device according to claim 1, wherein
   said receiving component is configured to sequential permutes a number order of said ID codes received from the wheels into ID code permutation blocks;
   an ID code permutation comparison component is configured to compare the ID code permutations of at least two ID code permutation blocks;
   said ID code registration component is further configured to register said ID codes when said ID code permutations of said at least two ID code permutation blocks compared by said ID code permutation comparison component matches each other, and stop registering said ID codes when the ID code permutations of said at least two ID code permutation blocks compared by said ID code permutation comparison component do not match each other, even when said detected function code matches said reference function code.

6. The tire air pressure monitoring device according to claim 5, further comprising
   a plurality of air pressure detection devices configured to be operatively coupled the wheels to detect tire air pressure of the wheels; and
   a plurality of transmitters configured to be operatively coupled the wheels to wirelessly transmits said detected function code of the wheels, said ID codes of the wheels, and said air pressure data of the wheels from said air pressure detection devices.

7. The tire air-pressure monitoring device according to claim 1, further comprising
   a plurality of air pressure detection devices configured to be operatively coupled the wheels to detect tire air pressure of the wheels; and
   a plurality of transmitters configured to be operatively coupled the wheels to wirelessly transmits said detected function code of the wheels, said ID codes of the wheels, and said air pressure data of the wheels from said air pressure detection devices.

8. A tire air pressure monitoring device comprising:
   a receiving component configured to wirelessly receive an ID code, and tire air pressure data for each wheel of a vehicle;

an ID code permutation component configured to permute a number order of said ID codes received and to form said ID codes into a block, an ID code permutation comparison component configured to compare said ID code permutations of at least two consecutive blocks, an ID code registration component configured to register said ID codes when said ID code permutations of two of said ID code permutation blocks compared by said ID code permutation comparison component matches each other.

9. The tire air pressure monitoring device according to claim 8, further comprising a plurality of air pressure detection devices configured to be operatively coupled the wheels to detect tire air pressure of the wheels; and a plurality of transmitters configured to be operatively coupled the wheels to wirelessly transmits said detected function code of the wheels, said ID codes of the wheels, and said air pressure data of the wheels from said air pressure detection devices.

10. A tire air pressure monitoring device comprising receiving means for wirelessly receiving a detected function code, an ID code, and tire air pressure data for each wheel of a vehicle;

ID code registration determining means for determining an ID code registration method based on a rotational state of the wheels;

function code setting means for setting a reference function code based on the results of said ID code registration determining component; and ID code data registration means for registering said ID codes of the wheels based on said reference function code set by said function code setting component.

11. The tire air pressure monitoring device according to claim 10, further comprising air pressure detection means for detecting tire air pressure of the wheels; and transmitting means for wirelessly transmitting said detected function code of the wheels, said ID codes of the wheels, and said air pressure data of the wheels from said air pressure detection means.

* * * * *